No. 640,115. Patented Dec. 26, 1899.
F. DÜRR.
SUPERHEATER.
(Application filed Dec. 11, 1897.)
(No Model.)
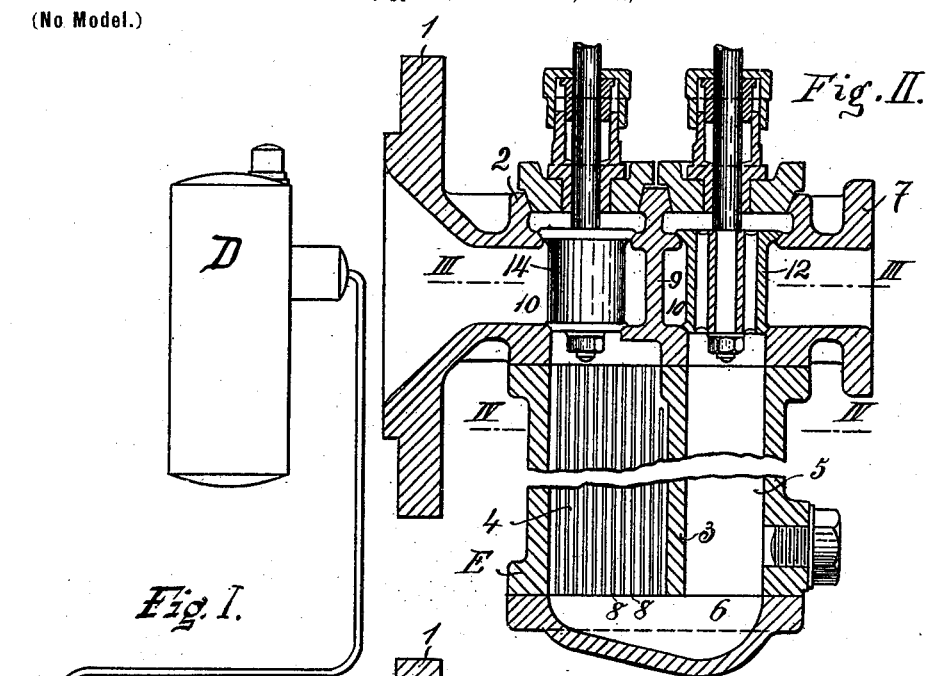
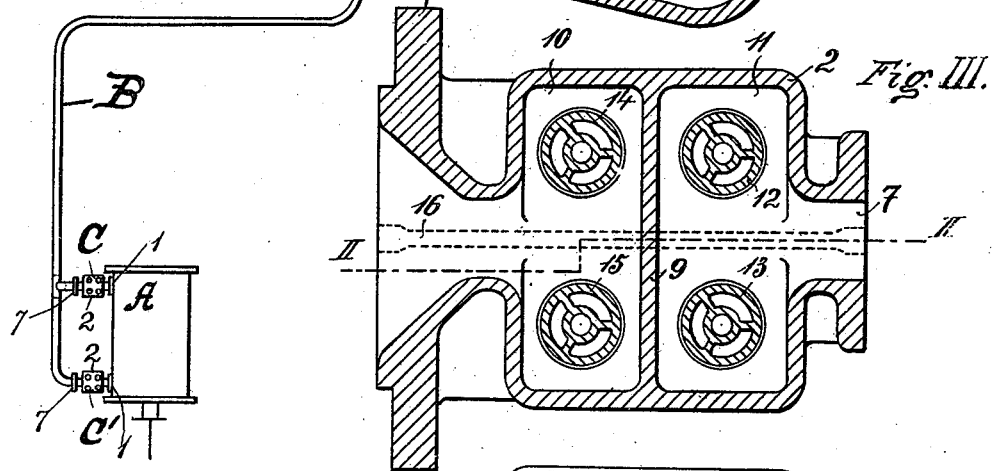
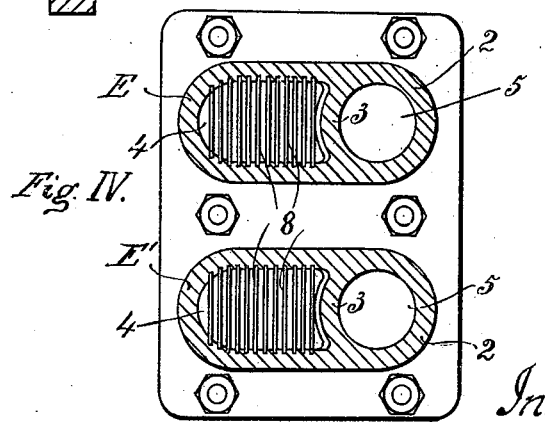
Witnesses;
Walter Allen
Herbert Bradley
Inventor;
Fritz Dürr
By Knight Bros, attys.

UNITED STATES PATENT OFFICE.

FRITZ DÜRR, OF BERLIN, GERMANY.

SUPERHEATER.

SPECIFICATION forming part of Letters Patent No. 640,115, dated December 26, 1899.

Application filed December 11, 1897. Serial No. 661,511. (No model.)

*To all whom it may concern:*

Be it known that I, FRITZ DÜRR, a subject of the King of Prussia, Emperor of Germany, and a resident of Alt-Moabite 97, Berlin, N. W., in the Kingdom of Prussia and Empire of Germany, have invented new and useful Improvements in Superheaters for Steam, Air, and Gas Engines, of which the following is a specification.

The subject of the present application constitutes a superheating arrangement for steam, air, or gas engines which has for its object to increase the tension of the pressure medium shortly before it enters the working cylinder and also to apply heat to the pressure medium during the period of expansion. The superheating arrangement can also be so timed that in rapidly-moving engines the pressure medium remains in the apparatus during the double-stroke period in order to find sufficient time to heat it correspondingly.

The accompanying drawings illustrate the subject of the invention, as follows:

Figure I shows the assembled arrangement of the apparatus as applied to a steam-engine. Fig. II shows the apparatus in vertical longitudinal section taken on the line II II, Fig. III. Fig. III is a horizontal section taken on the line III III, Fig. II. Fig. IV is such a horizontal section taken on the line IV IV, Fig. II.

As will be seen from Fig. I of the drawings, A represents the working cylinder, D a steam-boiler, and B the steam-pipe. The steam-pipe is connected with both ends of the working cylinder by the superheating apparatus C introduced between the steam-pipe and the working cylinder in accordance with the present application.

The arrangement of the apparatus will be understood by the accompanying drawings.

The flange 1 at one side of the housing 2 is attached to the cylinder and the flange 7 at the other side of the housing 2 is connected to the steam-pipe B. The housing 2 is provided with two downwardly-extending or pendent heaters E and E'. Each heater is divided by a vertical partition 3 into two chambers 4 and 5. The lower end of each heater is inclosed by a common cap 6, whereby communication is established between the chambers 4 and 5. In the chamber 4 are mounted heating-plates 8, upon which the admitted power medium strikes lengthwise. The capacity of the two chambers 4 and 5 corresponds to the intake charge of the working cylinder. The housing 2 is likewise divided into two valve-chambers 10 and 11 by means of a vertical partition-wall 9. The valve-chamber 11 stands in communication with the steam-pipe B, while the valve-chamber 10, on the other hand, stands in communication with the working space at one end of the working cylinder. Furthermore, the valve-chamber 11 stands in communication through the two valves 12 and 13 with the chamber 5 of the heater, and the valve-chamber 10 communicates through the two valves 14 and 15 with the chamber 4 of the heater. The valves will be operated through suitable controlling mechanism in a manner corresponding to the purpose for which they are intended. The heaters E and E' are to be heated by any suitable heating medium.

The method of operation is as follows: If the valves 12 and 13 are open, steam then enters through the same into the chamber 5 of the two heaters E and E' beneath said valves and, passing into the chamber, 4 heats itself therein. If the filling of the working cylinder follows, then the valves 14 and 15 open and the heated and highly-expanded steam enters through the same into the working space, where it comes into use. During these steps the heaters of the apparatus C', arranged at the opposite end of the working cylinder, will likewise be filled and the steam entering therein will be heated. If the piston has reached its stroke, then the valves 14 and 15 in the apparatus C' open and the performance of work upon the opposite side takes place. If, however, the steam remains in the heater for a longer time and can be still more heated, then the valves 12 and 13 will be correspondingly operated. Obviously both the heaters of the apparatus C or C' will be filled. Then, for example, the valve 14 of the apparatus C opens and the heated steam passes from the heater E into the working space of the cylinder in order to perform work. After this has taken place and the piston has reached its stroke the heater E of the apparatus C' comes into operation, inasmuch as the valve 14 at that place opens and the heated steam from the heater E enters the working space; but during this period the heater E of the apparatus C fills itself again, in the manner already described, with fresh boiler-steam. As soon as the working piston again arrives at C then the valve 15 of the heater E' first opens and the steam enters to the working. In this manner we obtain the result that the steam remains closed up in the heater during two double-stroke periods and produces a high heating effect, which for rapidly-moving engines is of great value. This apparatus, however, can be used in connection with two cylinders, so that a double use, as illustrated in Fig. I, is then essential. In such a case we would divide the valve-chambers 10 and 11 into two subchambers by means of the vertical partition 16, (shown in dotted lines in Fig. III,) so that the first chamber would communicate with the left-hand end of the cylinder, while the other would communicate with the right-hand end of the cylinder.

Having thus described my invention, the following is what I claim as new therein and desire to secure by Letters Patent:

1. The combination with a working cylinder and the pressure-pipe of an engine, of the superheater, interposed between the pressure-pipe and the working cylinder, comprising a housing constructed with flanges, with a vertical partition, dividing the upper part of the housing into two valve-chambers and with a pendent heater having a vertical partition dividing the heater into two chambers, the valves located in the valve-chambers, and controlling the heater-chambers, and the cap to the heater whereby communication is established between the lower ends of the heater-chambers; substantially as described.

2. The combination, with a working cylinder and the pressure-pipe of an engine; of the superheater, interposed between the pressure-pipe and the working cylinder comprising a housing constructed with flanges, with a vertical partition dividing the upper part of the housing into two valve-chambers, and with pendent heaters each having a vertical partition dividing the heaters into two chambers, valves located in the valve-chambers, and controlling the heater-chambers, and the caps to the heaters whereby communication is established between the lower ends of the heater-chambers; substantially as described.

3. The combination, with a working cylinder and the pressure-pipe of an engine; of the two superheaters interposed between the pressure-pipe and the respective ends of the working cylinder, each superheater comprising a housing constructed with flanges, with a vertical partition dividing the heater into two chambers, valves located in the valve-chambers and controlling the heater-chambers, and the caps to the heaters whereby communication is established between the lower ends of the heater-chambers; substantially as described.

4. A superheater for steam, air, or gas engines, comprising a housing adapted to be interposed between the pressure-pipe and the working cylinder comprising a housing constructed with flanges, with a vertical partition dividing the upper part of the housing into two valve-chambers, and with pendent heaters each having a vertical partition, dividing the heater into two chambers, valves located in the valve-chambers and controlling the heater-chambers, and the caps to the heaters whereby communication is established between the lower ends of the heater-chambers; substantially as described.

The foregoing specification signed at Berlin, Germany, this 26th day of November, 1897.

FRITZ DÜRR.

In presence of—
HENRY HASPER,
WOLDEMER HAUPT.